(12) United States Patent
Littell et al.

(10) Patent No.: US 9,662,751 B1
(45) Date of Patent: May 30, 2017

(54) MODULAR FIXTURING SYSTEM

(71) Applicant: The United States of America as Represented by the Administrator of the National Aeronautics and Space Administration, Washington, DC (US)

(72) Inventors: Justin Anderson Littell, Huntsville, AL (US); Jon P. Street, Madison, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 3 days.

(21) Appl. No.: 14/869,203

(22) Filed: Sep. 29, 2015

(51) Int. Cl.
*B23K 37/00* (2006.01)
*B23K 37/04* (2006.01)

(52) U.S. Cl.
CPC .................. *B23K 37/0426* (2013.01)

(58) Field of Classification Search
CPC .. B23K 37/0426; B23K 37/0452; B23Q 1/01; F16M 13/02
USPC ........... 269/57, 289 R, 900, 71, 55; 29/281.1
See application file for complete search history.

(56) References Cited

U.S. PATENT DOCUMENTS

| | | | | |
|---|---|---|---|---|
| 2,105,171 A * | 1/1938 | Tjaarda | ................... | B60G 3/01 267/246 |
| 2,998,789 A * | 9/1961 | Schaufelberger | .. | B23K 37/0426 219/158 |
| 3,965,557 A * | 6/1976 | Pruitt, Jr. | ............... | E04B 1/2403 269/904 |
| 3,977,532 A * | 8/1976 | Hackman | ................. | B61G 1/22 213/208 |
| 4,491,307 A * | 1/1985 | Ellefson | ............. | B23K 37/0452 269/246 |
| 4,941,411 A * | 7/1990 | Wong | ........................ | B61D 7/02 105/410 |
| 6,170,141 B1 * | 1/2001 | Rossway | ............... | B64F 5/0036 206/319 |
| 6,279,217 B1 * | 8/2001 | Gallinger | ........... | B23K 37/0229 29/281.1 |
| 6,283,361 B1 * | 9/2001 | Maki | .................. | B23K 37/0452 228/212 |
| 2003/0208893 A1 * | 11/2003 | Kilibarda | ........... | B23K 37/0443 29/407.01 |
| 2005/0252947 A1 * | 11/2005 | Fujii | .................... | B23K 20/122 228/112.1 |

* cited by examiner

*Primary Examiner* — Larry E Waggle, Jr.
*Assistant Examiner* — Henry Hong
(74) *Attorney, Agent, or Firm* — Absolute Technology Law Group, LLC; James J. McGroary

(57) ABSTRACT

The modular fixturing system of the present invention is modular, reusable and capable of significant customization, both in terms of system radius and system height, allowing it to be arranged and rearranged in numerous unique configurations. The system includes multiple modular stanchions having stanchion shafts and stanchion feet that removably attach to apertures in a table. Angle brackets attached to the modular stanchions support shelves. These shelves in turn provide support to work pieces during fabrication processes such as welding.

20 Claims, 12 Drawing Sheets

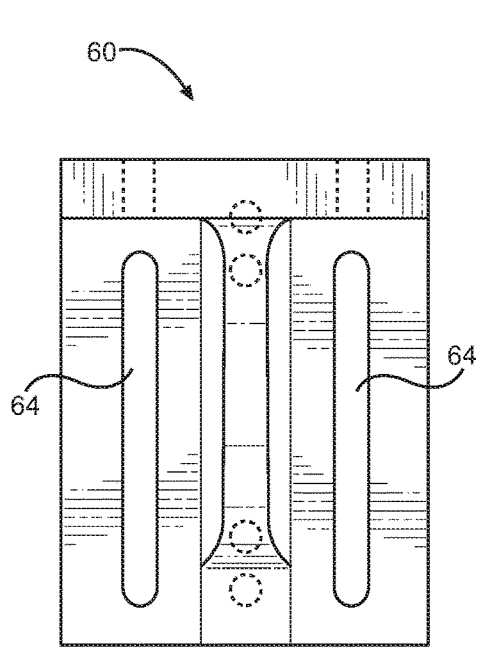
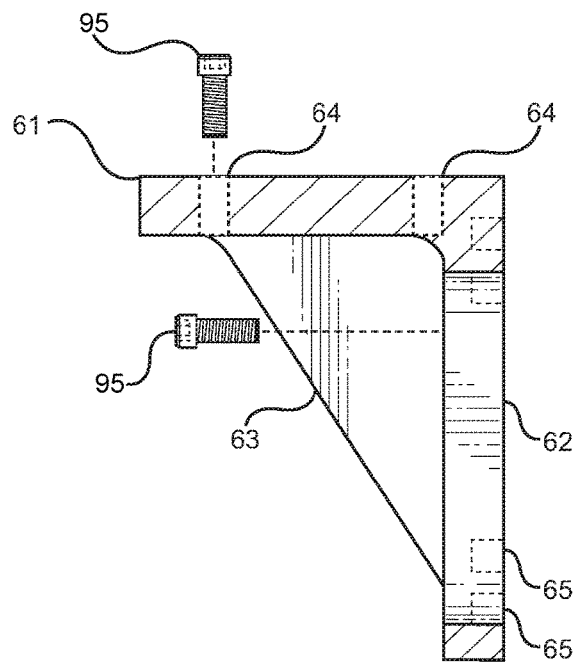
Fig. 5a     Fig. 5b
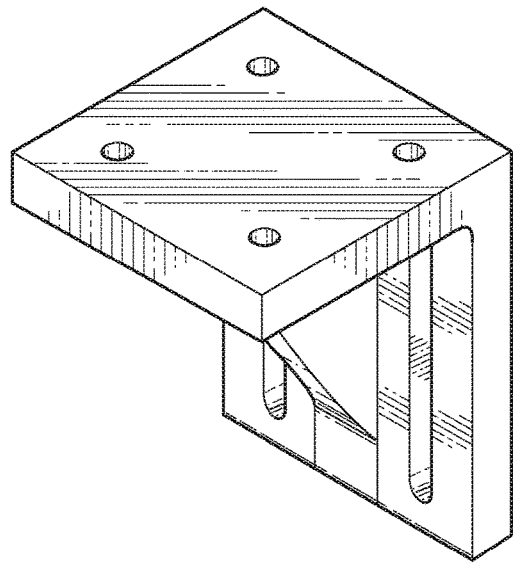
Fig. 5c

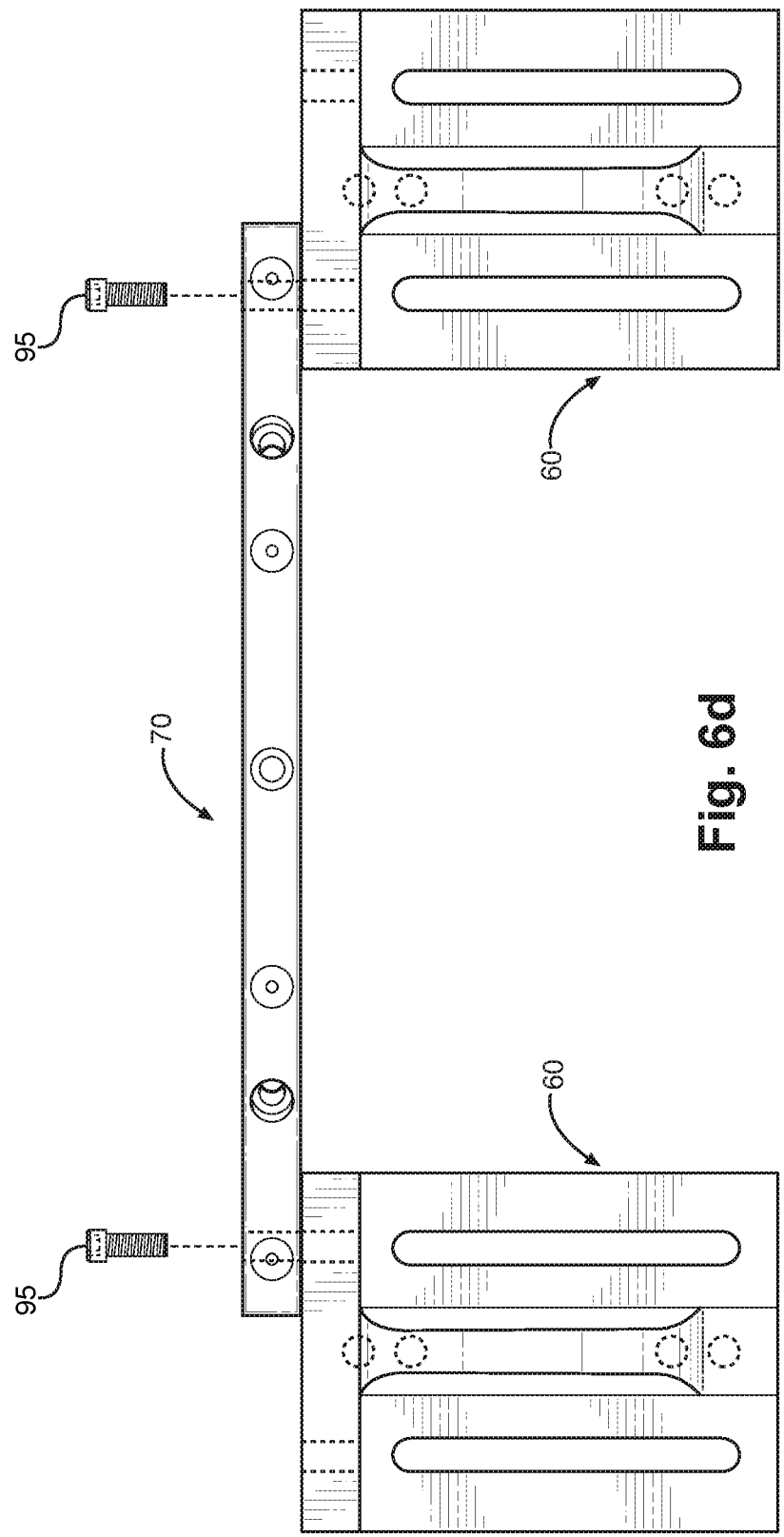

MODULAR FIXTURING SYSTEM

CROSS-REFERENCES TO RELATED APPLICATIONS

The invention described herein was made by an employee of the United States Government and may be manufactured and used by the Government of the United States of America for governmental purposes without the payment of any royalties thereon or therefore.

BACKGROUND OF THE INVENTION

1. Field of Invention

This invention relates to the field of metal fabrication and more specifically to a fixturing system capable of holding components in place for large-scale fabrication projects.

2. Description of Related Art

NASA and the aerospace industry require highly specialized equipment for the fabrication of rockets and other aerospace vehicles. These projects require assembly and manipulation of large components with very low error tolerance. For example, in 2014, NASA developed a specialized Vertical Assembly Center to construct the 200-foot-tall core stage for a massive rocket designed for extended manned missions.

Welding and fabrication processes require the use of frameworks to secure rocket components in place during fabrication. Currently, large-scale fixturing systems known in the art are constructed from stationary pipes and rods, which are joined to form a framework. Movable components referred to as shoes extend from the pipes and rods to provide for precise positional adjustments. When fabrication is complete, this framework must be disassembled or stored using large amounts of storage space.

Reusable fixturing systems known in the art cannot withstand the heavy loads or meet stress requirements necessary for rocket fabrication. The use of easily disassembled modular components introduces unacceptable error to the assembly process due to deformation and misalignment of components during assembly. Misalignment may not be visible during fabrication, but can render a finished object unusable.

There is an unmet need in the art for a modular fixturing system capable of accommodating large-scale fabrication projects, such as rockets and other spacecraft.

SUMMARY OF THE INVENTION

The present invention is a novel modular stanchion system constructed using a plurality of stanchions, shelves and brackets in place of pipes and rods. Each modular stanchion includes a stanchion shaft connected to at least one stanchion foot. This stanchion foot connects to an aperture in a table. The stanchion shaft has apertures used to connect objects to the stanchion and to connect the stanchion to other objects. Angle brackets connect to the modular stanchions, and shelves connect to the angle brackets. Each of the angle brackets includes a bracket platform component and an upright component. The bracket platform and upright components include apertures. The shelves have a substantially planar configuration. Each of the shelves includes apertures. Fasteners extend through the stanchion, bracket and shelf apertures.

BRIEF DESCRIPTION OF THE DRAWINGS

FIGS. 5a-5c illustrate front, side and perspective views, respectively, of an exemplary embodiment of an angle bracket.

FIGS. 6a-6c illustrate top, front and perspective views, respectively, of an exemplary embodiment of a shelf, while FIG. 6d illustrates a front view of an exemplary embodiment of the shelf mounted to angle brackets.

TERMS OF ART

As used herein, the term "angle bracket" means a substantially right-angled support attached to and projecting from a surface having a vertical component.

As used herein, the term "brace" means an optional support attachment.

As used herein, the term "cap" means a component connected to a stanchion shaft and contacting a component being fabricated.

As used herein, the term "clevis" means a substantially U-shaped connector within which another part can be fastened by means of a pin passing through apertures in the connector.

As used herein, the term "foot" means a component capable of connecting to a stanchion shaft and a table.

As used herein, the term "knuckle" means a joint capable of rotation in at least one direction.

As used herein, the term "modular" means capable of being selectively attached, removed or changed.

As used herein, the term "rotatably" means capable of revolving around an axis.

As used herein, the term "shaft" means the primary portion of a stanchion that extends at least partially vertically.

As used herein, the term "stanchion" means a bar or post assembly extending at least partially vertically.

As used herein, the term "table" means a component or base to which one or more modular stanchions are secured.

As used herein, the term "turnbuckle" means a coupling using a threaded connection to adjust the tension or distance between two points.

DETAILED DESCRIPTION

Figure 1A:
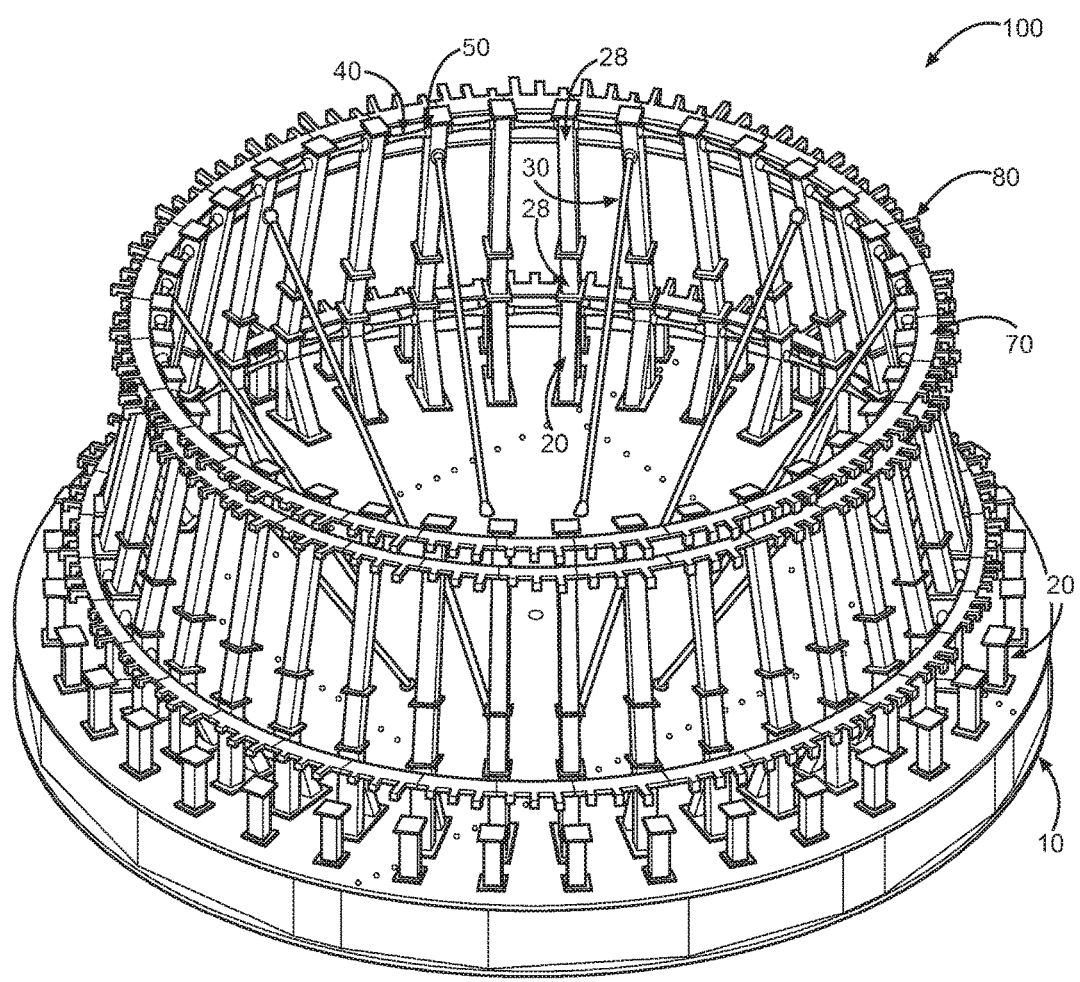
FIGS. 1a-1c illustrate perspective views of first and second configurations and a partial side view of the second configuration, respectively, of an exemplary embodiment of a modular stanchion system (MSS).
Figure 1B:
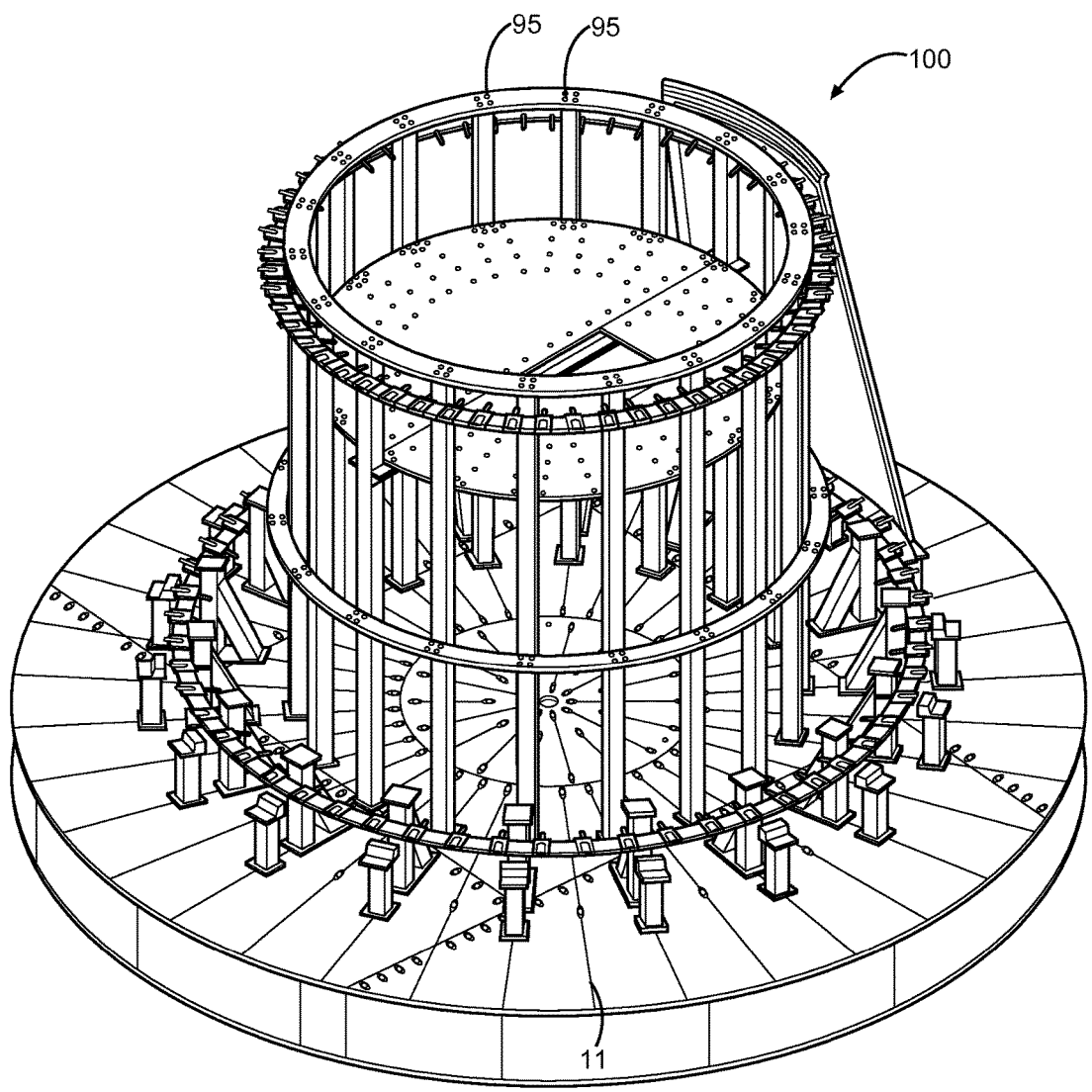
Figure 1C:
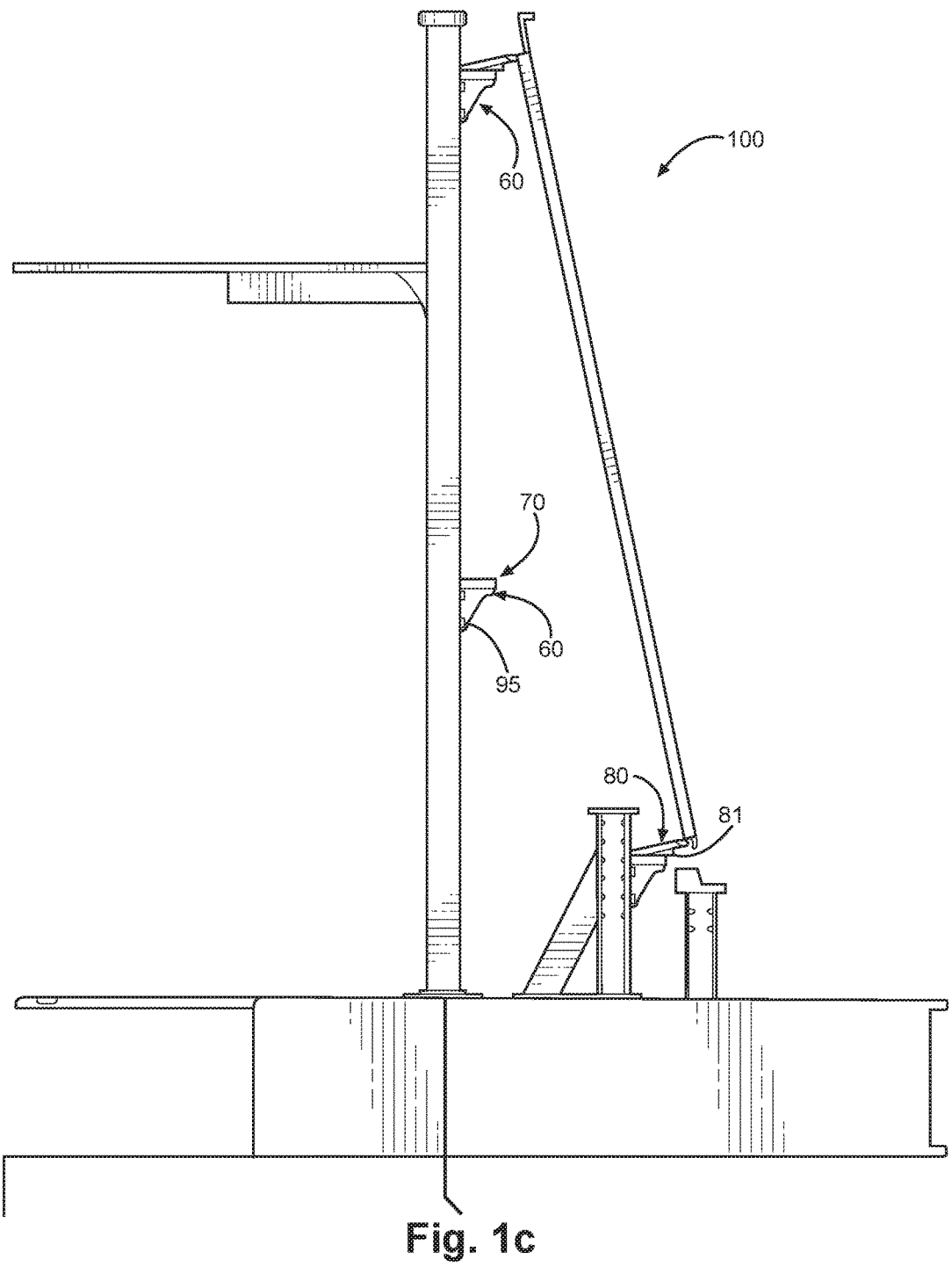

FIGS. 1a-1c illustrate perspective views of first and second configurations and a partial side view of the second configuration, respectively, of an exemplary embodiment of MSS 100. MSS 100 mounts to a table 10 having a plurality of table apertures 11. In the exemplary embodiment, table 10 is a round turntable. In other embodiments, table 10 is a fixed rectangular table, fixed round table or rectangular turntable. In the exemplary embodiment, table apertures 11 are elongated slots. In other embodiments, table apertures 11 are round, square or rectangular apertures.

MSS 100 includes a plurality of modular stanchions 20, a plurality of optional stanchion braces 30, a plurality of optional turnbuckles 40, a plurality of optional knuckles 50, a plurality of angle brackets 60, a plurality of shelves 70, a plurality of optional shoe assemblies 80 and a plurality of fasteners 95. Modular stanchions 20 and stanchion braces 30 connect to table apertures 11. Knuckles 50 connect stanchion braces 30 and turnbuckles 40 to modular stanchions 20. Angle brackets 60 connect shelves 70 to modular stanchions 20. Shelves 70 support shoe assemblies 80. Fasteners 95 connect knuckles 50 and angle brackets 60 to modular stanchions 20, angle brackets 60 to shelves 70, and shelves 70 to shoe assemblies 80. Stanchion braces 30 provide additional reinforcement against forces exerted on MSS 100.

Figure 2A:
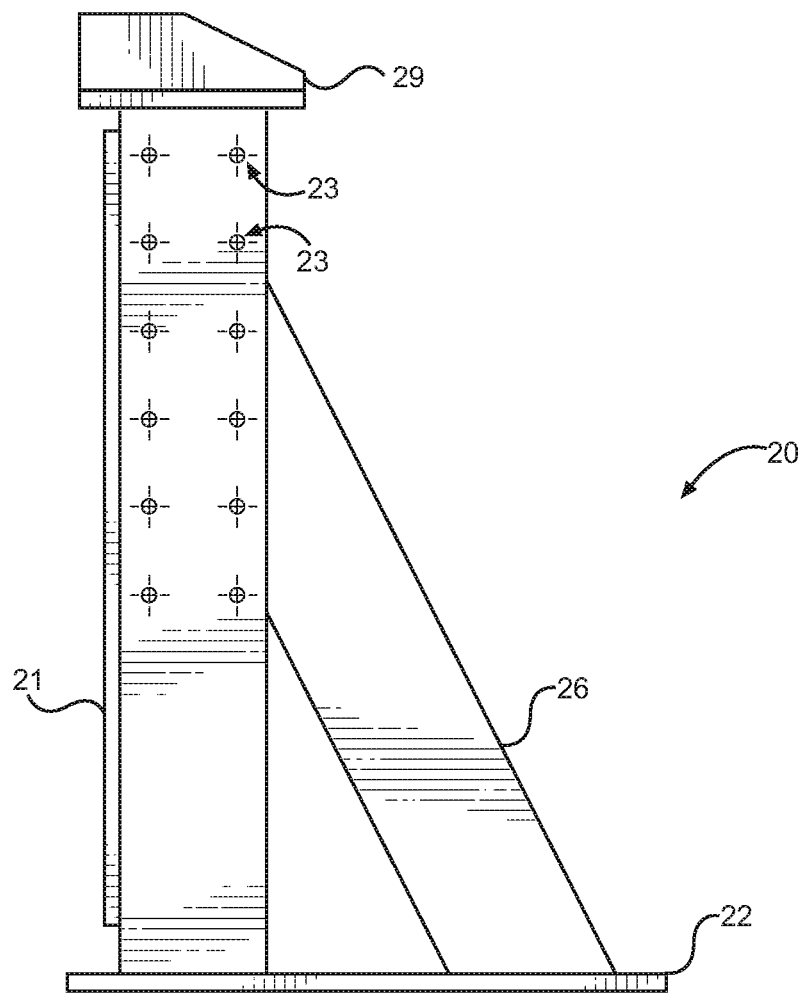
FIGS. 2a and 2b illustrate side and partial top views, respectively, of an exemplary embodiment of a modular stanchion with an optional fixed angle support.
Figure 2B:
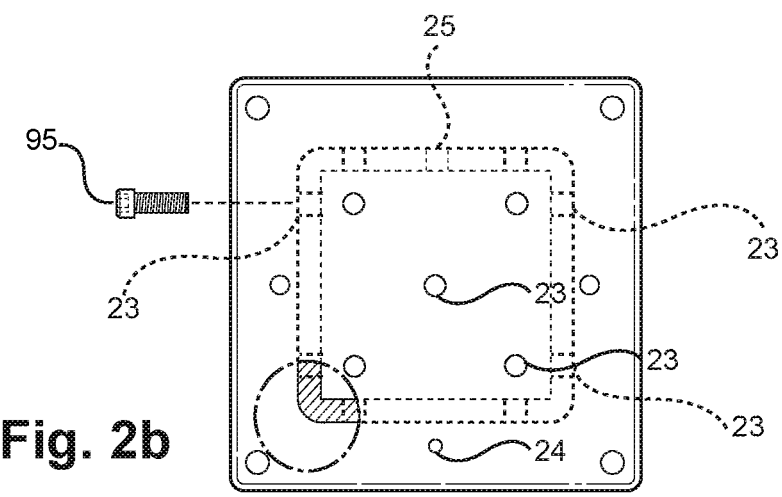

FIGS. 2a and 2b illustrate side and partial top views, respectively, of an exemplary embodiment of modular stanchion 20 with optional fixed angle support 26. Modular stanchions 20 provide significant load-bearing capabilities to MSS 100 and serve to interconnect other components of MSS 100 with table 10. Repositioning modular stanchions 20 on table 10 allows for gross adjustment of the overall radius of MSS 100.

In this embodiment, modular stanchion 20 includes a stanchion shaft 21, at least one stanchion foot 22, a plurality of stanchion attachment apertures 23, at least one optional stanchion tracker 24, a plurality of optional stanchion dowel apertures 25, a fixed angle support 26 and an optional stanchion cap 29. Stanchion shaft 21 is a vertical shaft with a rectangular cross-section fixedly mounted to stanchion foot 22. Stanchion shaft 21 has a length ranging from approximately 1 foot to approximately 50 feet. Stanchion foot 22 connects to at least one table aperture 11 to adjustably position modular stanchion 20 on table 10. In the exemplary embodiment, both stanchion shaft 21 and fixed angle support 26 mount to the same stanchion foot 22. In other embodiments, stanchion shaft 21 and fixed angle support 26 each mount to their own stanchion foot 22.

Stanchion shaft 21 also includes stanchion attachment apertures 23 on at least one side. In the exemplary embodiment, stanchion attachment apertures 23 are located on all four sides and the upper surface of stanchion shaft 21. In the exemplary embodiment, stanchion attachment apertures 23 form multiple groupings, each grouping made up of four stanchion attachment apertures 23 arranged in a substantially square pattern. The spacing of these groupings accommodates complementary apertures in knuckles 50 and angle brackets 60. Other components may also attach to stanchion shaft 21 using stanchion attachment apertures 23.

In the exemplary embodiment, stanchion shaft 21 also includes stanchion tracker 24, a laser tracker hole located on the upper surface of stanchion shaft 21. When moving modular stanchion 20 into position on table 10, stanchion tracker 24 allows a user to determine when modular stanchion 20 reaches the correct position. All modular stanchions 20 within MSS 10 have stanchion trackers 24 in the same location to ensure uniform positioning. In the exemplary embodiment, stanchion shaft 21 also includes stanchion dowel apertures 25. Stanchion dowel apertures 25 receive dowels that peg to complementary apertures in angle brackets 60 to accurately locate angle bracket 60 during attachment.

Fixed angle support 26 is an angled shaft fixed between stanchion shaft 21 and stanchion foot 22. When stanchion shaft 21 experiences angled or horizontal forces, fixed angle support 26 provides reinforcement. Fixed angle support 26 has a rectangular, square or round cross-section and forms an angle with stanchion foot 22 ranging from approximately 15 degrees to approximately 90 degrees.

Stanchion cap 29 is an aluminum block with an upper surface that supports work pieces during assembly and fabrication. This upper surface may be stepped, angled or flat. Stanchion cap 29 removably connects to the upper surface of stanchion shaft 21.

Figure 2C:
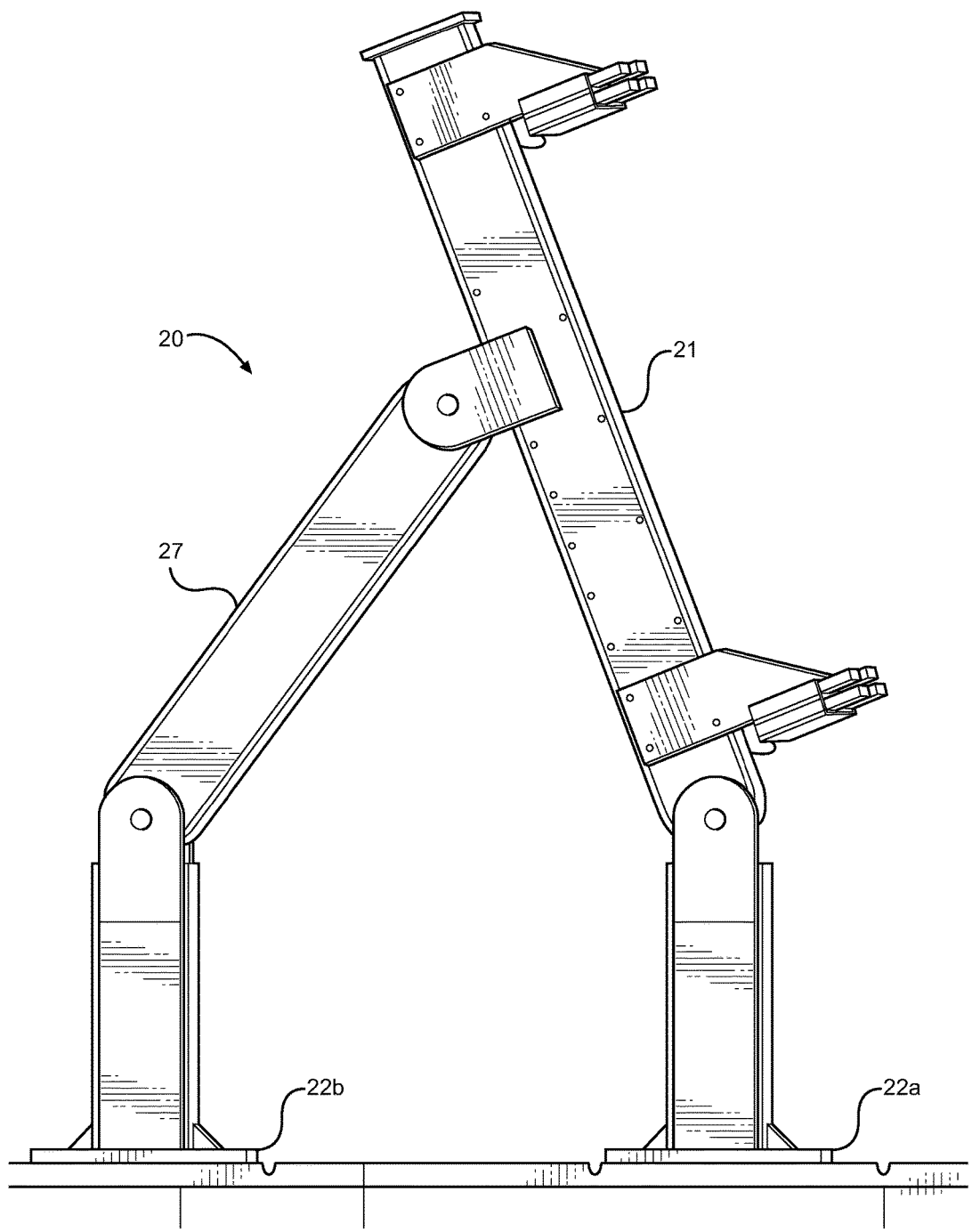
FIG. 2c illustrates a side view of an exemplary embodiment of a modular stanchion with an optional adjustable angle support.

FIG. 2c illustrates a side view of an exemplary embodiment of modular stanchion 20 with optional adjustable angle support 27. In this embodiment, modular stanchion 20 includes a stanchion shaft 21, two stanchion feet 22a and 22b, stanchion attachment apertures 23 and an adjustable angle support 27. The structure and function of stanchion attachment apertures 23 is substantially identical to those of the embodiment of FIGS. 2a and 2b above.

In this embodiment, stanchion shaft 21 is a vertical shaft with a rectangular cross-section rotatably connected to stanchion foot 22a and adjustable angle support 27. In this embodiment, stanchion shaft 21 and adjustable angle support 27 each rotatably connect to their own stanchion foot 22a and 22b, respectively. Stanchion feet 22a and 22b connect to table aperture 11 to adjustably position modular stanchion 20 on table 10. The distance between stanchion foot 22a and 22b determines the relative angle between stanchion shaft 21 and adjustable angle support 27, as well as the angulation of stanchion shaft 21. Stanchion shaft 21 forms an angle with stanchion foot 22a ranging from approximately 15 degrees to approximately 90 degrees.

Figure 2D:
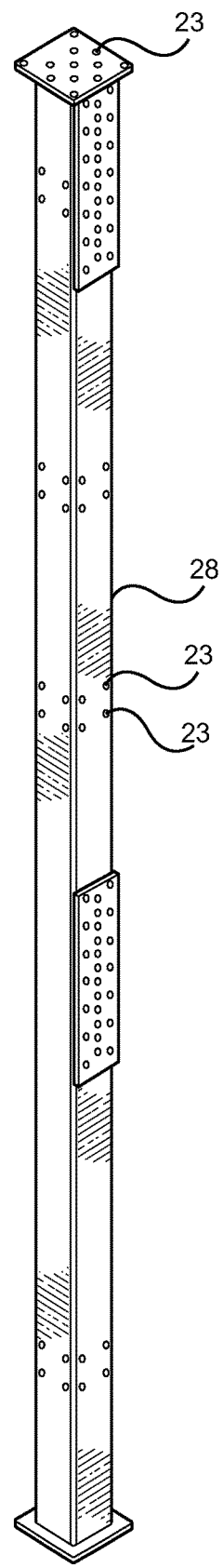
FIG. 2d illustrates a perspective view of an exemplary embodiment of a stanchion extension.

FIG. 2d illustrates a perspective view of an exemplary embodiment of stanchion extension 28. Stanchion extension 28 is a vertical shaft with a rectangular cross-section removably mounted to the upper surface of stanchion shaft 21 using stanchion attachment apertures 23. A user increases the overall height of stanchion shaft 21 by removably connecting at least one stanchion extension 28. In cases where additional height increase is necessary, one or more additional stanchion extensions 28 may connect to the first stanchion extension 28. The cross-section of stanchion extension 28 matches that of stanchion shaft 21. Each stanchion extension 28 has a height ranging from approximately 1 foot to approximately 50 feet.

Stanchion extension 28 also includes a plurality of stanchion attachment apertures 23. In the exemplary embodiment, stanchion attachment apertures 23 are located on all four sides and the upper and lower surfaces of stanchion extension 28. In the exemplary embodiment, stanchion attachment apertures 23 form multiple groupings, each grouping made up of four stanchion attachment apertures 23 arranged in a square pattern. The spacing of these groupings accommodates complementary apertures in stanchion shaft 21, other stanchion extensions 28, knuckles 50 and angle brackets 60.

Figure 3:
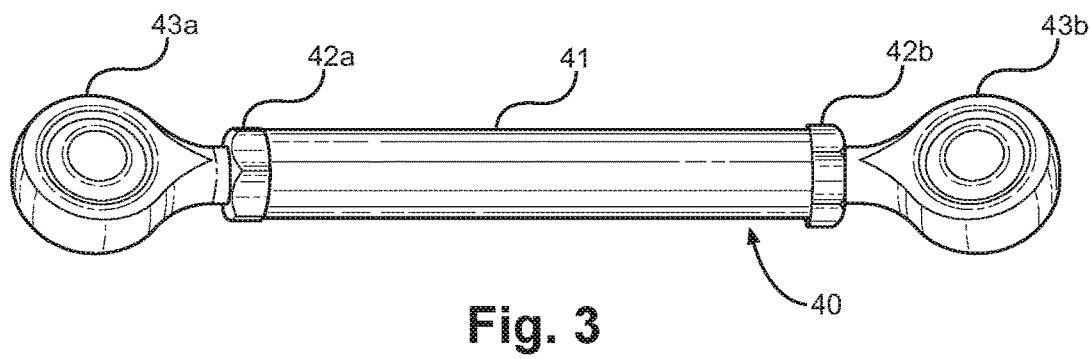
FIG. 3 illustrates a perspective view of an exemplary embodiment of a turnbuckle.

FIG. 3 illustrates a perspective view of an exemplary embodiment of turnbuckle 40. Turnbuckle 40 provides optional added stabilization between various elements of MSS 100. By way of non-limiting example, fixing turnbuckle 40 between two modular stanchions 20 provides resistance to lateral relative movement in modular stanchions 20.

Turnbuckle 40 includes a turnbuckle adjustment frame 41, two turnbuckle nuts 42a and 42b, and two turnbuckle eyebolts 43a and 43b. Turnbuckle adjustment frame 41 is a hollow cylinder having turnbuckle nuts 42a and 42b connected to either end. The threaded shank of each turnbuckle eyebolt 43a and 43b rotatably connects to turnbuckle nuts 42a and 42b, respectively. Rotation of turnbuckle eyebolts 43a and 43b relative to turnbuckle adjustment frame 41, or vice versa, serves to expand and contract the overall length of turnbuckle 40. The eye of each turnbuckle eyebolt 43a and 43b removably connects to one of knuckles 50.

Figure 4A:
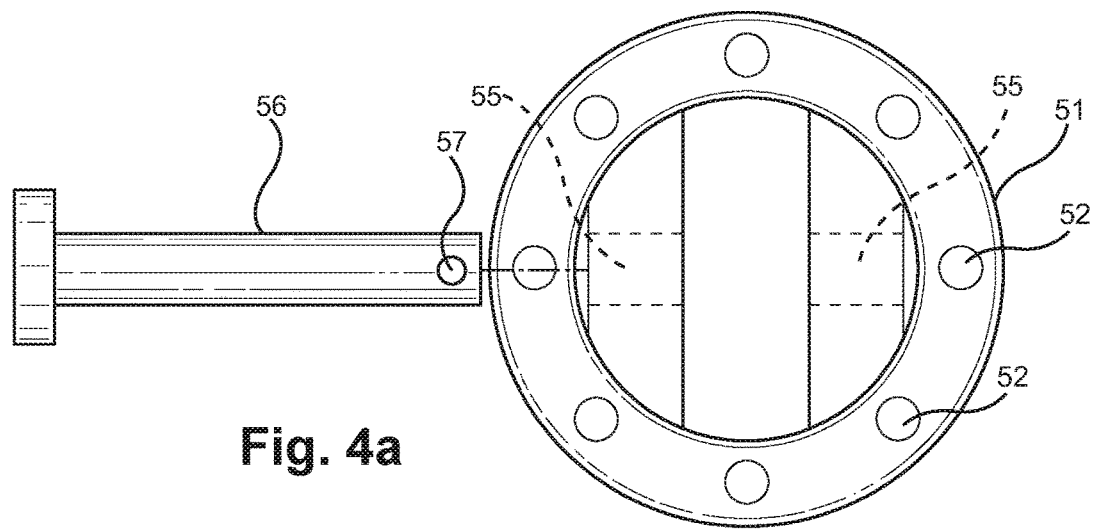
FIGS. 4a and 4b illustrate top and perspective views, respectively, of an exemplary embodiment of a knuckle.
Figure 4B:
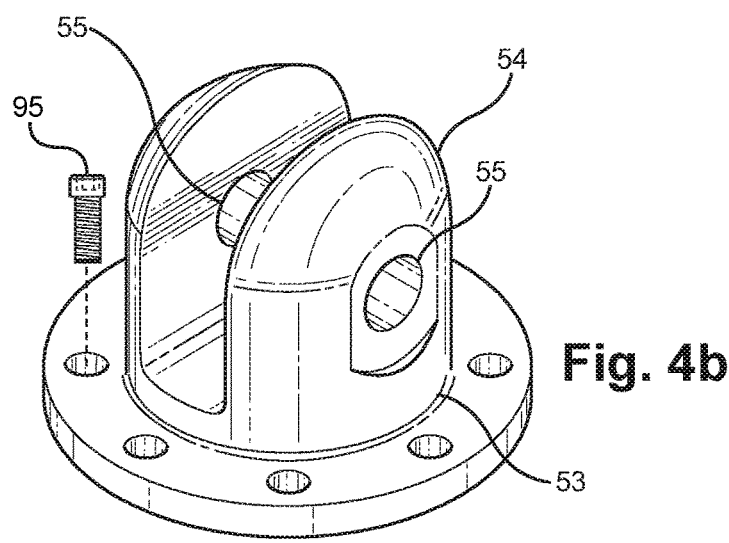

FIGS. 4a and 4b illustrate top and perspective views, respectively, of an exemplary embodiment of knuckle 50. Knuckle 50 optionally provides a highly modular connection between elements of MSS 100. Each knuckle 50 includes a knuckle base 51, a plurality of knuckle attachment apertures 52, a knuckle swivel 53, a knuckle clevis 54, a plurality of knuckle clevis pin apertures 55, a knuckle clevis pin 56 and a knuckle clevis pin lock 57. Knuckle base 51 removably connects to stanchion shaft 21 by means of fasteners 95 inserted through stanchion attachment apertures 23 and knuckle attachment apertures 52. In the exemplary embodiment, knuckle base 51 includes eight knuckle attachment apertures 52 arranged at 45-degree increments in a substantially circular pattern, allowing orientation and positioning of knuckle 50 in 45-degree increments relative to stanchion shaft 21.

Knuckle swivel 53 rotatably connects knuckle base 51 to knuckle clevis 54. Knuckle swivel 53 can rotate through 360 degrees. Knuckle clevis 54 receives turnbuckle eyebolt 43a or 43b between knuckle clevis pin apertures 55. Insertion of knuckle clevis pin 56 through eyebolt 43a or 43b and knuckle clevis pin apertures 55 removably connects turnbuckle 40 and knuckle 50. Insertion of knuckle clevis pin lock 57 through knuckle clevis pin 56 removably locks knuckle clevis pin 56 in place, preventing accidental dislodgment.

FIGS. 5a-5c illustrate front, side and perspective views, respectively, of an exemplary embodiment of angle bracket 60. Angle bracket 60 removably connects shelf 70 to modular stanchion 20. Angle bracket 60 has a substantially upside-down L-shaped configuration. Angle bracket 60 includes a bracket platform 61, a bracket upright 62, a bracket support 63, a plurality of bracket attachment apertures 64 and a plurality of bracket dowel apertures 65. Bracket platform 61 removably connects to shelf 70, while bracket upright 62 removably connects to modular stanchion 20. In the exemplary embodiment, bracket platform 61 supports lateral sides of two different shelves 70. Bracket support 63 extends between bracket platform 61 and bracket upright 62 to provide additional support to bracket platform 61.

In the exemplary embodiment, bracket attachment apertures 64 are located in both bracket platform 61 and bracket upright 62. In the exemplary embodiment, bracket attachment apertures 64 in bracket upright 62 have an elongated configuration. This configuration allows highly adjustable positioning of angle bracket 60 with respect to modular stanchion 20. In the exemplary embodiment, bracket dowel apertures 65 are located in bracket upright 62. Bracket dowel apertures 65 receive dowels that peg to complementary stanchion dowel apertures 25 to accurately locate angle bracket 60 during attachment to modular stanchion 20.

Figure 6A:
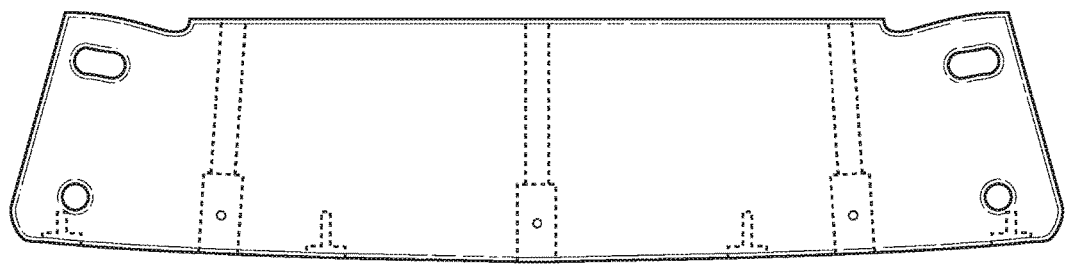
Figure 6B:
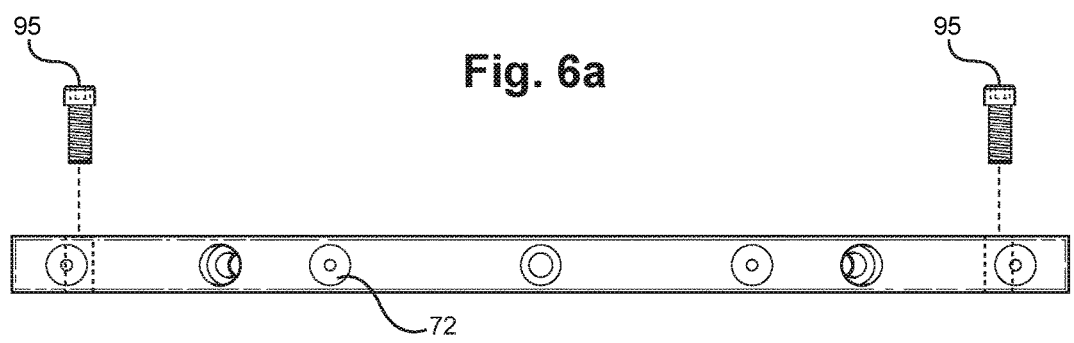
Figure 6C:
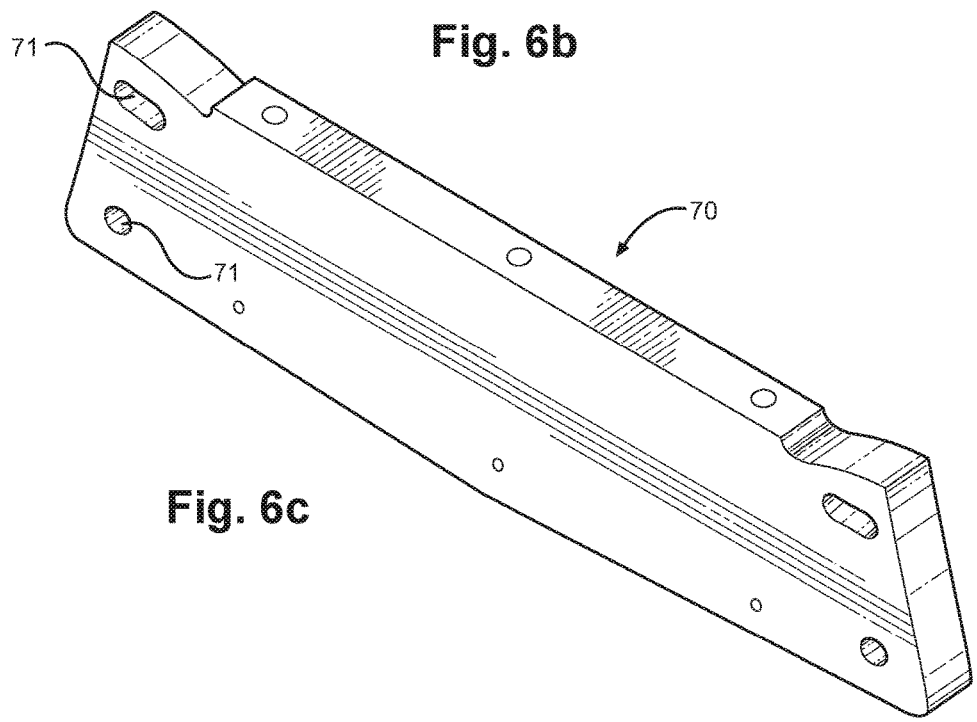

FIGS. 6a-6c illustrate top, front and perspective views, respectively, of an exemplary embodiment of shelf 70. Shelf 70 has a substantially planar configuration and is manufactured from metallic materials such as, but not limited to aluminum. In the exemplary embodiment, shelf 70 has a planar, partially curved rectangular configuration. The configuration of shelves 70 allows incremental alterations to MSS 100 diameter.

Shelf 70 supports shoe assembly 80 and connects shoe assembly 80 to modular stanchion 20. Shelf 70 includes a plurality of shelf attachment apertures 71 and at least one optional shelf tracker 72. Bracket platform 61 removably connects to a lower surface of shelf 70 through shelf attachment apertures 71. In the exemplary embodiment, two bracket platforms 61 support each shelf 70 through shelf attachment apertures 71 located on lateral sides of shelf 70. Other embodiments add one or more additional bracket platforms 61 to support each shelf 70 depending on the overall length of and support required for each shelf 70.

In the exemplary embodiment, shelf trackers 72 are laser tracker holes located on the upper surface of shelf 70 and the front surface of shelf 70. When connecting shelf 70 to modular stanchion 20, shelf trackers 72 allow a user to determine when shelf 70 reaches the correct height on modular stanchion 20 and position above table 10. In other embodiments, shelf 70 includes only a single shelf tracker 72.

Figure 7A:
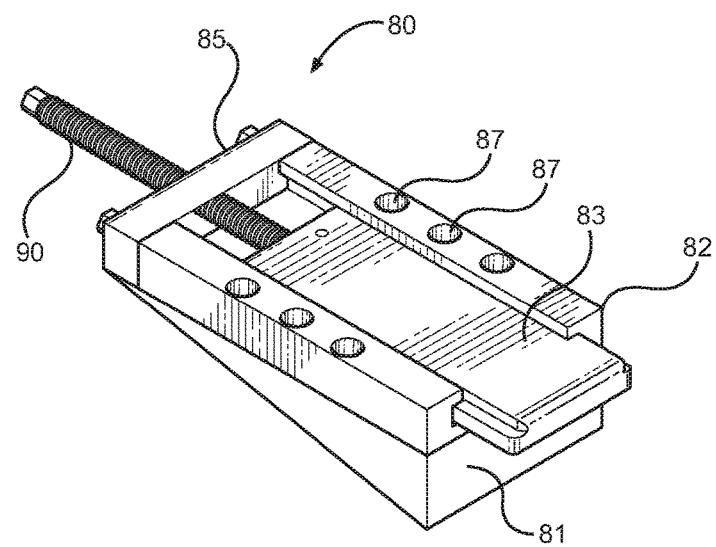
FIGS. 7a-7c illustrate perspective, exploded and top views, respectively, of an exemplary embodiment of a shoe assembly.
Figure 7B:
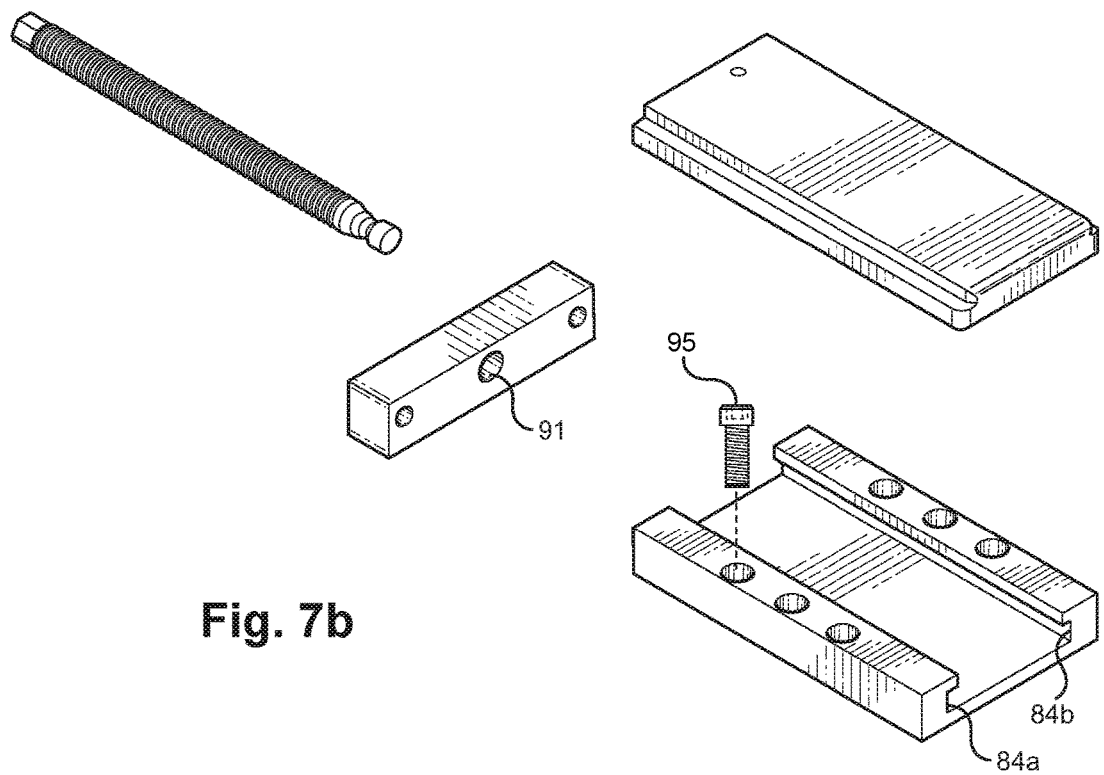
Figure 7C:
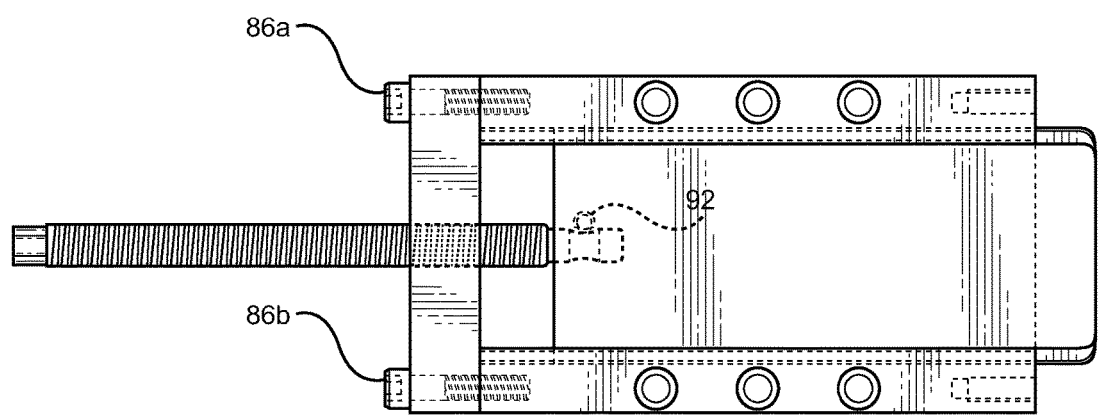

FIGS. 7a-7c illustrate perspective, exploded and top views, respectively, of an exemplary embodiment of shoe assembly 80. Shoe assembly 80 supports and rounds the work piece, allowing for fine adjustment of the overall radius of MSS 100. Shoe assembly 80 translates manufacturing loads placed on work pieces into MSS 100 while maintaining dimensional tolerances during fabrication. Shoe assembly 80 includes an optional shoe platform 81, a shoe frame 82, a shoe 83, two optional shoe grooves 84a and 84b, an optional shoe backplate 85, two optional shoe set screws 86a and 86b, a plurality of optional shoe attachment apertures 87, a threaded rod 90, an optional threaded rod aperture 91 and an optional rod set screw 92.

Shoe platform 81 is a removable separator between shoe frame 82 and shelf 70 having a substantially wedge-shaped configuration. When used, shoe platform 81 angles shoe frame 82 relative to shelf 70. This angulation may range from approximately one degree to approximately 45 degrees. Shoe frame 82 has a u-shaped cross-section. Shoe 83 has a box-shaped configuration with a rounded front surface. In the exemplary embodiment, the rounded front surface of shoe 83 has a radius of approximately 0.25 inches. Other embodiments may have a radius of up to one inch. In the exemplary embodiment, shoe 83 is made from aluminum. Optionally, shoe 83 can slidably connect to shoe frame 82 through shoe grooves 84a and 84b in the inner lateral sides of shoe frame 82 for additional guidance during use.

Shoe backplate 85 can close off the rear of shoe frame 82. Shoe backplate 85 connects across the rear of shoe frame 82, with shoe set screws 86a and 86b extending through shoe backplate 85 and into shoe frame 82. In the exemplary embodiment, fasteners 95 extend through shoe attachment apertures 87 to removably connect shoe frame 82 to shelf 70. In other embodiments, shoe assembly 80 is an integrated part of shelf 70.

The front end of threaded rod 90 extends within shoe 83, allowing shoe 83 to extend from and retract into shoe frame 82 by movement of threaded rod 90. In the exemplary embodiment, the configuration of the back end of threaded rod 90 can be, but is not limited to, a substantially recessed, square, pentagonal or hexagonal cross-section. This allows removable connection to manual or powered drivers, such as, but not limited to a hand tool, drill or motor.

In the exemplary embodiment, threaded rod 90 extends through threaded rod aperture 91 in shoe backplate 85. Threaded rod aperture 91 has an internal threading that substantially corresponds to the external threading of threaded rod 90, allowing guided extension and retraction of threaded rod 90 through threaded rod aperture 91. In the exemplary embodiment, rod set screw 92 holds threaded rod 90 in place within shoe 83. In use, rotation of threaded rod 90 to extend shoe 83 pushes on shoe 83, not rod set screw 92.

Fasteners 95 are standardized bolts having identical gauge and thread density (threads per inch). In the exemplary embodiment, fasteners 95 are bolts with a diameter of approximately 0.5 inches and a thread density of approximately 13.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "substantially" or "approximately" as used herein may be applied to modify any quantitative representation that could permissibly vary without resulting in a change in the basic function to which it is related.

What is claimed is:

1. A modular stanchion system, comprising:
   a table supporting a plurality of modular stanchions, wherein each of said plurality of modular stanchions comprises at least one stanchion foot and a stanchion shaft, wherein said stanchion foot is connected to at least one table aperture in said table, wherein said stanchion shaft has a plurality of stanchion attachment apertures;
   a plurality of angle brackets connected to said plurality of modular stanchions, wherein each of said plurality of angle brackets comprises a bracket platform and a bracket upright, wherein said bracket platform comprises a plurality of bracket attachment apertures, wherein said bracket upright comprises a plurality of bracket attachment apertures;
   a plurality of variably positioned shelves removably connected to said plurality of angle brackets to allow incremental alterations to a diameter of said system, wherein each of said plurality of shelves has a substantially planar configuration, wherein each of said plurality of shelves comprises a plurality of shelf attachment apertures;
   a plurality of shoe frames removably connected to said variably positioned shelves, wherein each of said plurality of shoe frames is slidably connected to a shoe, wherein said shoe may extend from said shoe frame; and
   a plurality of fasteners extending through said plurality of stanchion attachment apertures, said plurality of bracket attachment apertures and said plurality of shelf attachment apertures.

2. The system of claim 1, wherein said plurality of stanchion attachment apertures form multiple groupings, wherein each grouping is made up of four stanchion attachment apertures arranged in a substantially square pattern.

3. The system of claim 1, wherein each of said plurality of modular stanchions further comprises a plurality of stanchion dowel apertures, wherein each of said plurality of angle brackets further comprises a plurality of bracket dowel apertures.

4. The system of claim 1, wherein each of said plurality of modular stanchions further comprises at least one stanchion tracker located on an upper surface of each of said plurality of modular stanchions.

5. The system of claim 1, wherein each of said plurality of modular stanchions further comprises a fixed angle support extending between said stanchion shaft and said at least one stanchion foot.

6. The system of claim 1, wherein said at least one stanchion foot comprises a first stanchion foot and a second stanchion foot, wherein each of said plurality of modular stanchions further comprises an adjustable angle support extending between said first stanchion foot and said stanchion shaft, wherein said adjustable angle support is rotatably connected to said first stanchion foot and said stanchion shaft, wherein said stanchion shaft is rotatably connected to said second stanchion foot.

7. The system of claim 1, further comprising at least one stanchion extension removably connected to an upper surface of said stanchion shaft.

8. The system of claim 1, further comprising at least one stanchion cap removably connected to an upper surface of said stanchion shaft.

9. The system of claim 1, further comprising at least one stanchion brace extending between said stanchion shaft and at least one table aperture.

10. The system of claim 1, wherein each of said plurality of angle brackets further comprises a bracket support extending between said bracket upright and said bracket platform.

11. The system of claim 1, wherein each of said plurality of shelves is supported along a first lateral edge by one of said plurality of angle brackets and along a second lateral edge by another of said plurality of angle brackets.

12. The system of claim 1, wherein each of said plurality of shelves further comprises at least one shelf tracker located on at least one of an upper surface of each of said plurality of shelves or a front surface of each of said plurality of shelves.

13. The system of claim 1, wherein each of said plurality of fasteners comprises a bolt having a diameter of approximately 0.5 inches and a thread density of approximately 13 threads per inch.

14. The system of claim 1, wherein each of said plurality of shoe frames includes a threaded rod extending through each of said plurality of said shoe frames and into said shoe.

15. The system of claim 14, further comprising at least one shoe platform removably located between at least one of said plurality of shelves and at least one of said plurality of shoe frames, said at least one shoe platform having a substantially wedge-shaped configuration.

16. The system of claim 14, further comprising a shoe backplate connected to each of said plurality of shoe frames by a plurality of shoe set screws, said shoe backplate having a threaded rod aperture, said threaded rod extending through said threaded rod aperture.

17. The system of claim 14, wherein a front surface of said shoe has a radius of up to one inch.

18. The system of claim 14, wherein a back end of said threaded rod has a cross-section selected from the group consisting of: substantially recessed, square, pentagonal or hexagonal cross-sections.

19. The system of claim 1, further comprising:
   a plurality of knuckles connected to said plurality of modular stanchions, wherein each of said plurality of knuckles comprises a knuckle base having a plurality of attachment apertures, a knuckle swivel rotatably interconnecting said knuckle base and a knuckle clevis, and a knuckle clevis pin removably extending through a plurality of knuckle clevis pin apertures in said knuckle clevis; and a plurality of turnbuckles connected to said plurality of knuckles, wherein each of said plurality of turnbuckles comprises a plurality of turnbuckle eyebolts rotatably connected to a turnbuckle adjustment frame through a plurality of turnbuckle nuts.

20. The system of claim 19, wherein said plurality of knuckle attachment apertures comprise eight knuckle attachment apertures arranged at 45-degree increments in a substantially circular pattern on said knuckle base.

* * * * *